US011774964B2

(12) United States Patent
Iwamoto et al.

(10) Patent No.: US 11,774,964 B2
(45) Date of Patent: Oct. 3, 2023

(54) VEHICLE REMOTE INSTRUCTION SYSTEM

(71) Applicant: Toyota Jidosha Kabushiki Kaisha, Toyota (JP)

(72) Inventors: Takayuki Iwamoto, Shizuoka (JP); Sho Otaki, Yokohama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 352 days.

(21) Appl. No.: 16/803,079

(22) Filed: Feb. 27, 2020

(65) Prior Publication Data
US 2020/0326702 A1 Oct. 15, 2020

(30) Foreign Application Priority Data
Apr. 15, 2019 (JP) ................................. 2019-077280

(51) Int. Cl.
*G05D 1/00* (2006.01)
*B60W 60/00* (2020.01)
*B60T 7/16* (2006.01)

(52) U.S. Cl.
CPC .............. *G05D 1/0055* (2013.01); *B60T 7/16* (2013.01); *B60W 60/0016* (2020.02); *G05D 1/0022* (2013.01); *G05D 2201/0213* (2013.01)

(58) Field of Classification Search
CPC ............... G05D 1/0055; G05D 1/0022; G05D 2201/0213; B60W 60/0016; B60T 7/16
See application file for complete search history.

(56) References Cited

U.S. PATENT DOCUMENTS

| 6,088,635 A | * | 7/2000 | Cox | .............. B61L 23/041 |
| | | | | 701/19 |
| 8,996,240 B2 | * | 3/2015 | Plante | .................. H04N 7/183 |
| | | | | 701/33.3 |
| 10,345,809 B2 | * | 7/2019 | Ross | ................. B60W 60/0059 |
| 10,866,106 B2 | | 12/2020 | Arakawa | |
| 10,991,176 B2 | | 4/2021 | Yoshizaki et al. | |
| 10,991,254 B2 | | 4/2021 | Hayashi et al. | |

(Continued)

FOREIGN PATENT DOCUMENTS

| CN | 108490949 A | * | 9/2018 | .......... G05D 1/0214 |
| JP | 2008-299657 A | | 12/2008 | |

(Continued)

*Primary Examiner* — Redhwan K Mawari
(74) *Attorney, Agent, or Firm* — Dinsmore & Shohl LLP

(57) ABSTRACT

A vehicle remote instruction system is a system in which a remote operator performs a remote instruction relating to travel of an autonomous driving vehicle according to a situation of the autonomous driving vehicle. The system includes: a recording required situation determination unit configured to determine whether or not the autonomous driving vehicle traveling according to the remote instruction is in a predetermined recording required situation, based on detection information from a vehicle-mounted sensor of the autonomous driving vehicle, if the remote operator performs the remote instruction on the autonomous driving vehicle; and a remote instruction result recording unit configured to record position information of the autonomous driving vehicle as a result of the remote instruction, if it is determined by the recording required situation determination unit that the autonomous driving vehicle is in the recording required situation.

20 Claims, 7 Drawing Sheets

(56) References Cited

U.S. PATENT DOCUMENTS

| | | | |
|---|---|---|---|
| 11,048,263 B2 | 6/2021 | Urano | |
| 11,052,780 B2 | 7/2021 | Taguchi et al. | |
| 11,176,385 B2 * | 11/2021 | Kristensen | B60W 30/09 |
| 11,215,982 B2 | 1/2022 | Urano et al. | |
| 11,281,215 B2 | 3/2022 | Yoshizaki et al. | |
| 11,325,618 B2 | 5/2022 | Umeda | |
| 2008/0300731 A1 | 12/2008 | Nakajima et al. | |
| 2010/0250060 A1 | 9/2010 | Maeda et al. | |
| 2011/0130894 A1 * | 6/2011 | Kim | G08G 1/096844 |
| | | | 701/2 |
| 2016/0334230 A1 * | 11/2016 | Ross | B60W 60/0059 |
| 2018/0343401 A1 * | 11/2018 | Campbell | G06T 7/521 |
| 2019/0066516 A1 | 2/2019 | Kuhara | |
| 2019/0163176 A1 * | 5/2019 | Wang | G05D 1/0027 |
| 2019/0191311 A1 * | 6/2019 | O'Brien | G01C 21/20 |
| 2019/0317491 A1 | 10/2019 | Kobayashi et al. | |
| 2020/0004240 A1 * | 1/2020 | Biehler | G05D 1/0212 |
| 2020/0361428 A1 * | 11/2020 | Blumentritt | B60T 17/221 |
| 2021/0221339 A1 * | 7/2021 | Oba | B60W 60/0017 |

FOREIGN PATENT DOCUMENTS

| | | | | |
|---|---|---|---|---|
| JP | 2009-087024 A | | 4/2009 | |
| JP | 2013-117998 A | | 6/2013 | |
| JP | 2017214051 A | * | 12/2017 | B64C 39/02 |
| JP | 2018-140755 A | | 9/2018 | |
| JP | 2019005819 A | * | 1/2019 | B25J 11/008 |
| JP | 2019-040587 A | | 3/2019 | |
| JP | 2019-046176 A | | 3/2019 | |
| KR | 20180008593 A | * | 1/2018 | |

* cited by examiner

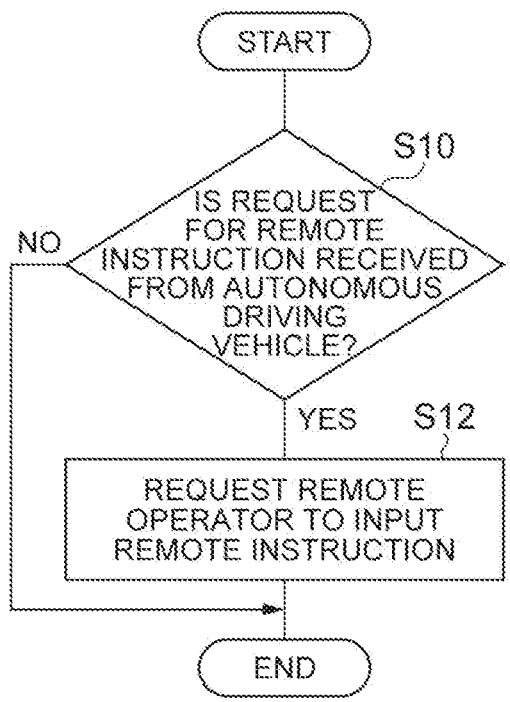
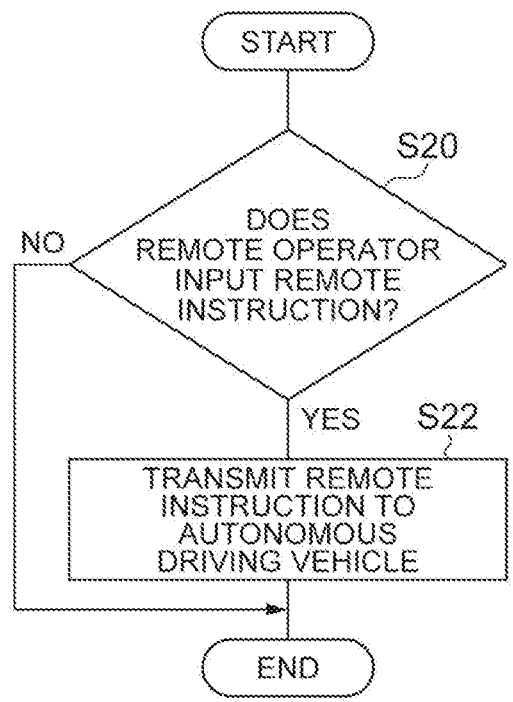

VEHICLE REMOTE INSTRUCTION SYSTEM

CROSS-REFERENCE TO RELATED APPLICATION

This application claims the benefit of priority from Japanese Patent Application No. 2019-077280, filed Apr. 15, 2019, the entire content of which are incorporated herein by reference.

TECHNICAL FIELD

The present disclosure relates to a vehicle remote instruction system.

BACKGROUND

In the related art, Japanese Unexamined Patent Publication No. 2018-140755 is known as a technical literature relating to a vehicle remote instruction system. This publication discloses a remote control in which an amount of steering a steering wheel by a remote operator is transmitted to an autonomous driving vehicle, and then, a steering system of the autonomous driving vehicle is steered according to the amount of steering by a remote operator.

SUMMARY

Incidentally, instead of the remote control described above, a system is considered, in which the remote operator gives a remote instruction such as to perform traveling, and the autonomous driving vehicle autonomously travels according to the remote instruction when the autonomous driving vehicle requires a human determination. In this case, unlike the remote control, since the remote operator cannot always know the result of remote instruction, it is desirable to store a record when the autonomous driving vehicle traveling according to the remote instruction is in a situation where the record needs to be recorded (for example, a situation where an emergency brake is operated).

According to an aspect of the present disclosure, a vehicle remote instruction system is a system in which a remote operator performs a remote instruction relating to travel of an autonomous driving vehicle according to a situation of the autonomous driving vehicle. The system includes: a recording required situation determination unit configured to determine whether or not the autonomous driving vehicle traveling according to the remote instruction is in a predetermined recording required situation, based on detection information from a vehicle-mounted sensor of the autonomous driving vehicle, if the remote operator performs the remote instruction on the autonomous driving vehicle; and a remote instruction result recording unit configured to record position information of the autonomous driving vehicle as a result of the remote instruction, if it is determined by the recording required situation determination unit that the autonomous driving vehicle is in the recording required situation.

According to the vehicle remote instruction system according to an aspect of the present disclosure, if it is determined that the autonomous driving vehicle traveling according to the remote instruction is in the predetermined recording required situation, the position information of the autonomous driving vehicle can be recorded as a result of remote instruction.

In the vehicle remote instruction system according to an aspect of the present disclosure, the recording required situation determination unit may be configured to determine that the autonomous driving vehicle is in the recording required situation, if the autonomous driving vehicle traveling according to the remote instruction operates an emergency brake.

In the vehicle remote instruction system according to an aspect of the present disclosure, the remote instruction result recording unit may be configured to record the position information of the autonomous driving vehicle and the detection information from the vehicle-mounted sensor of the autonomous driving vehicle in association with each other as the result of the remote instruction, if it is determined by the recording required situation determination unit that the autonomous driving vehicle is in the recording required situation.

In the vehicle remote instruction system according to an aspect of the present disclosure, the remote instruction result recording unit may be configured to record the position information of the autonomous driving vehicle and identification information of the remote operator in association with each other, if it is determined by the recording required situation determination unit that the autonomous driving vehicle is in the recording required situation.

In the vehicle remote instruction system according to an aspect of the present disclosure, the remote instruction result recording unit may be configured not to record the result of the remote instruction regardless of a result of the determination performed by the recording required situation determination unit, if the remote instruction is to perform an emergency evacuation.

According to the vehicle remote instruction system in an aspect of the present disclosure, it is possible to record the result of remote instruction when the autonomous driving vehicle traveling according to the remote instruction is in a predetermined recording required situation.

BRIEF DESCRIPTION OF THE DRAWINGS

FIG. 6A is a flowchart illustrating an example of remote instruction request processing.

FIG. 6B is a flowchart illustrating an example of remote instruction transmission processing.

DETAILED DESCRIPTION

Hereinafter, embodiments of the present disclosure will be described with reference to the drawings.

Figure 1:
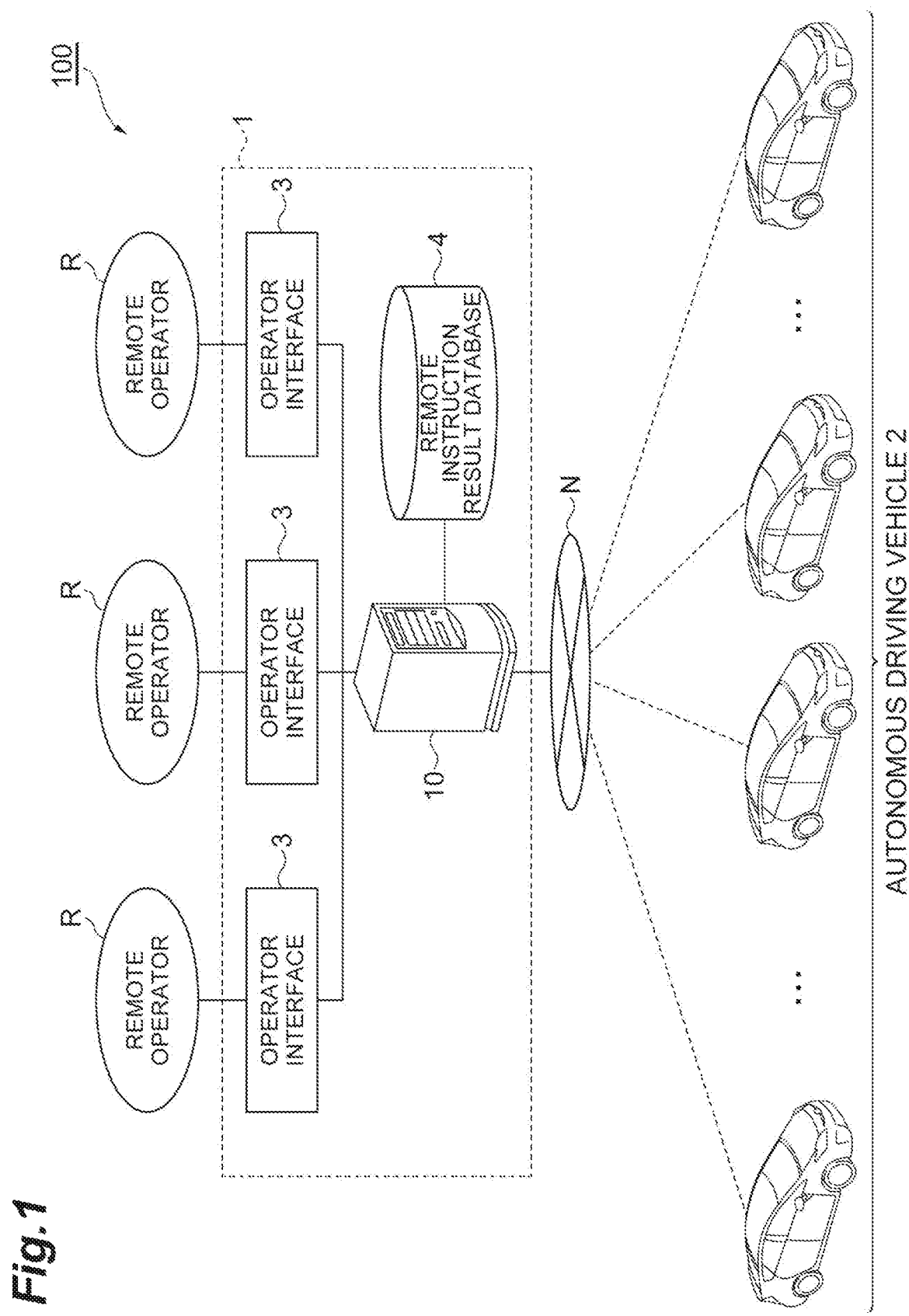
FIG. 1 is a diagram illustrating an overview of a vehicle remote instruction system according to an embodiment.

FIG. 1 is a diagram illustrating an overview of a vehicle remote instruction system according to an embodiment. A vehicle remote instruction system 100 illustrated in FIG. 1 is a system that performs a remote instruction to autonomous driving vehicles 2 by remote operators R. The remote instruction is an instruction from the remote operator R regarding the determination for traveling of the autonomous driving vehicle 2.

The remote instruction includes at least one of an instruction for starting a right turn at an intersection, an instruction for starting an approach at an intersection with traffic signals, an instruction for starting an approach at an intersection with poor visibility, an instruction for starting a lane change, an instruction for starting an offset avoidance for obstacles ahead, and an emergency evacuation. In a case of a country or a region of a vehicle's right-side traffic, it can be an instruction for starting a left turn at the intersection instead of the instruction for starting the right turn at the intersection. The intersection with poor visibility is an intersection where it is difficult to visually recognize the situation of an intersecting road due to a wall or the like when approaching the intersection. The intersection with poor visibility is registered in advance in map information, for example. Whether or not the intersection with poor visibility may be determined according to an approaching direction of the autonomous driving vehicle 2 to the intersection.

The offset avoidance for the obstacles ahead is a travel to offset so that the autonomous driving vehicle 2 temporarily protrudes in an adjacent lane or an opposite lane in order to avoid a stopped vehicle when, for example, there is a stopped vehicle that stops near the road edge in front of the autonomous driving vehicle 2. The stopped vehicle in this case is not limited to a four-wheeled vehicle, and may be a two-wheeled vehicle. The obstacles ahead may be a bicycle, a personal mobility, a pedestrian, or the like, or may be moving ones. The emergency evacuation is a control for automatically evacuating the autonomous driving vehicle 2 to an evacuation space such as a road shoulder. The evacuation space is set in advance on a map, for example. The remote operator R selects a remote instruction of the emergency evacuation when, for example, an abnormality of the autonomous driving vehicle 2 is recognized or when an abnormality of occupants is recognized.

In addition, the remote instruction may include an instruction for starting the autonomous driving vehicle 2 that has been in a parking state. The remote instruction may include an instruction for starting the autonomous driving vehicle 2 when a pedestrian or the like is detected around the autonomous driving vehicle 2 that has been stopped. The remote instruction may include an instruction relating to occupants getting on and off of the autonomous driving vehicle 2 (for example, an instruction to open or close the door automatically and an instruction to start voice guidance for getting off the vehicle).

Configuration of Vehicle Remote Instruction System

As illustrated in FIG. 1, a vehicle remote instruction system 100 includes a remote instruction apparatus 1 in which a remote operator R inputs a remote instruction. The remote instruction apparatus 1 is communicably connected to a plurality of autonomous driving vehicles 2 via a network N. The network N is a wireless communication network. Various information is sent to the remote instruction apparatus 1 from the autonomous driving vehicles 2.

In the vehicle remote instruction system 100, for example, the remote operator R is requested to input a remote instruction in response to a remote instruction request from an autonomous driving vehicle 2. The remote operator R inputs the remote instruction to an operator interface 3 of the remote instruction apparatus 1. The remote instruction apparatus 1 transmits the remote instruction to the autonomous driving vehicle 2 through the network N. The autonomous driving vehicle 2 autonomously travels according to the remote instruction. The remote instruction apparatus 1 acquires a result of traveling of the autonomous driving vehicle 2 according to the remote instruction under a certain condition, and records the result in a remote instruction result database 4.

In the vehicle remote instruction system 100, the number of remote operators R is not limited, and may be one or may be equal to or more than 2. The number of autonomous driving vehicles 2 that can communicate with the vehicle remote instruction system 100 is also not particularly limited. A plurality of remote operators R may alternately perform the remote instruction for one autonomous driving vehicle 2 or one remote operator R may perform the remote instruction for two or more autonomous driving vehicles 2.

Configuration of Autonomous Driving Vehicle

Figure 2:
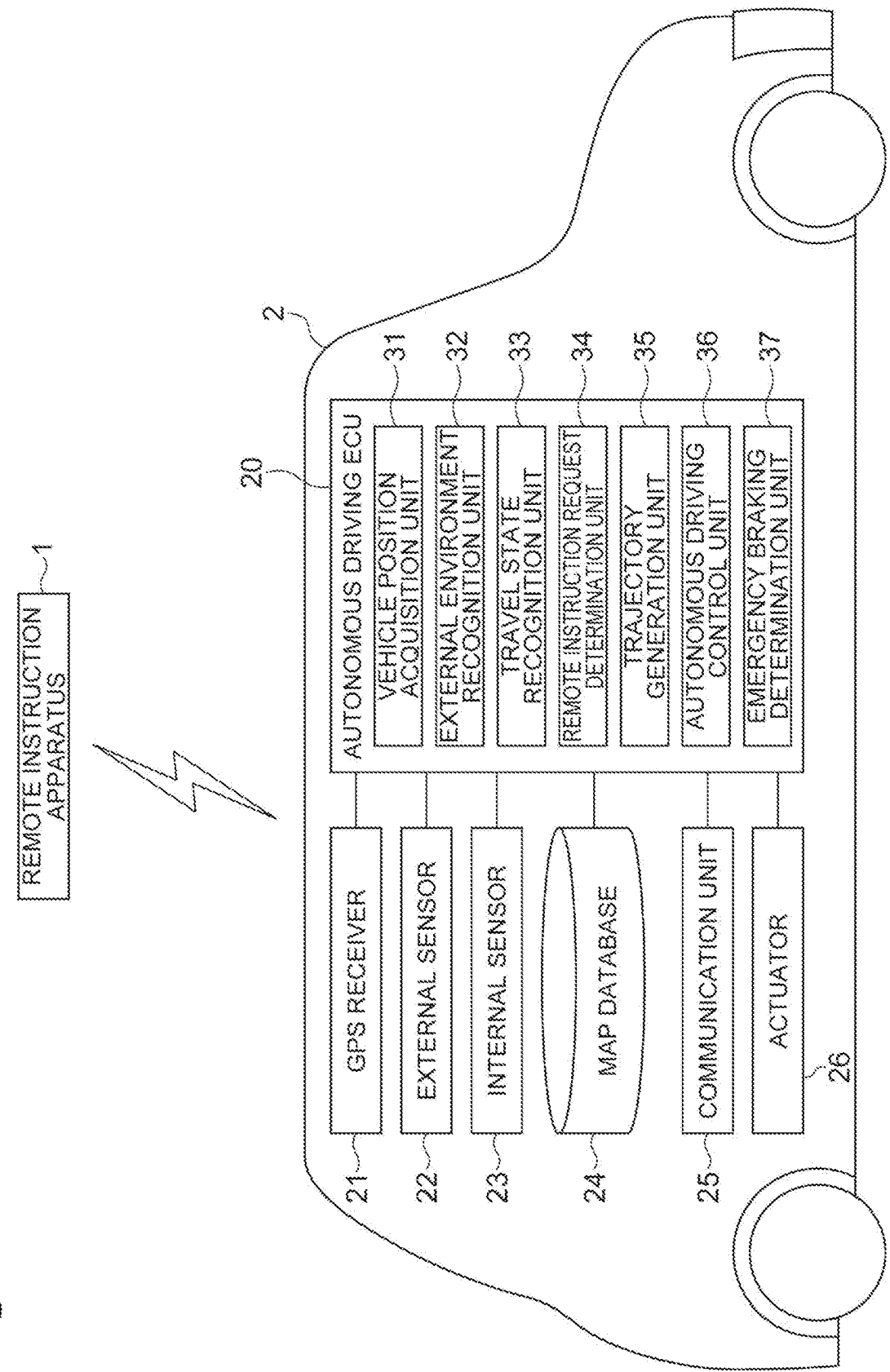
FIG. 2 is a block diagram illustrating an example of a configuration of an autonomous driving vehicle.

First, an example of the configuration of the autonomous driving vehicle 2 will be described. FIG. 2 is a block diagram illustrating an example of a configuration of the autonomous driving vehicle 2. As illustrated in FIG. 2, the autonomous driving vehicle 2 includes an autonomous driving ECU 20 as an example. The autonomous driving ECU 20 is an electronic control unit having a CPU, ROM, RAM, and the like. In the autonomous driving ECU 20, for example, various functions are realized by loading a program recorded in the ROM into the RAM and executing the program loaded in the RAM by the CPU. The autonomous driving ECU 20 may be configured with a plurality of electronic units.

The autonomous driving ECU 20 is connected to a global positioning system (GPS) receiver 21, an external sensor 22 (a vehicle-mounted sensor), an internal sensor 23 (a vehicle-mounted sensor), a map database 24, a communication unit 25, and an actuator 26.

The GPS receiver 21 measures a position of the autonomous driving vehicle 2 (for example, latitude and longitude of the autonomous driving vehicle 2) by receiving signals from equal to or more than three GPS satellites. The GPS receiver 21 transmits information on the measured position of the autonomous driving vehicle 2 to the autonomous driving ECU 20.

The external sensor 22 is a vehicle-mounted sensor that detects an external environment of the autonomous driving vehicle 2. The external sensor 22 includes at least a camera. The camera is an imaging device that images the external environment of the autonomous driving vehicle 2. The camera is provided on the inside of a windshield of the autonomous driving vehicle 2 and images the front of the vehicle. The camera transmits imaging information relating to the external environment of the autonomous driving vehicle 2 to the autonomous driving ECU 20. The camera may be a monocular camera or may be a stereo camera. A plurality of cameras may be provided, and may image the left and right sides and the rear side, in addition to the front of the autonomous driving vehicle 2. The autonomous driving vehicle 2 may be provided with an external camera for the remote operator. The external camera for the remote operator images at least the front of the autonomous driving vehicle 2. The external camera for the remote operator may be configured with a plurality of cameras that image the surroundings including the side and rear of the autonomous driving vehicle 2.

The external sensor 22 may include a radar sensor. The radar sensor is a detection device that detects an object around the autonomous driving vehicle 2 using radio waves (for example, millimeter waves) or light. The radar sensor includes, for example, millimeter wave radar or a light detection and ranging (LIDAR). The radar sensor transmits the radio wave or light to the surroundings of the autonomous driving vehicle 2, and detects the objects by receiving the radio waves or the light reflected from the objects. The radar sensor transmits the detected object information to the autonomous driving ECU 20. The objects include fixed objects such as guardrails and buildings, and moving objects such as pedestrians, bicycles, other vehicles, and the like. In addition, the external sensor 22 may include a sound detection sensor that detects a sound outside the autonomous driving vehicle 2.

The internal sensor 23 is a vehicle-mounted sensor that detects a travel state of the autonomous driving vehicle 2. The internal sensor 23 includes a vehicle speed sensor, an accelerator sensor, and a yaw rate sensor. The vehicle speed sensor is a measurement device that measures a speed of the autonomous driving vehicle 2. As a vehicle speed sensor, for example, a vehicle wheel speed sensor is used, which is provided on vehicle wheels of the autonomous driving vehicle 2 or on a drive shaft rotating integrally with vehicle wheels, and measures a rotational speed of the vehicle wheels. The vehicle speed sensor transmits the measured vehicle speed information (vehicle wheel speed information) to the autonomous driving ECU 20.

The accelerator sensor is a measurement device that measures an acceleration of the autonomous driving vehicle 2. The accelerator sensor includes, for example, a longitudinal accelerator sensor that measures acceleration in the longitudinal direction of the autonomous driving vehicle 2 and the accelerator sensor may include a lateral accelerator sensor that measures a lateral acceleration of the autonomous driving vehicle 2. The accelerator sensor transmits, for example, acceleration information of the autonomous driving vehicle 2 to the autonomous driving ECU 20. The yaw rate sensor is a measurement device that measures a yaw rate (rotation angular velocity) around the vertical axis at the center of gravity of the autonomous driving vehicle 2. As the yaw rate sensor, for example, a Gyro sensor can be used. The yaw rate sensor transmits the measured yaw rate information of the autonomous driving vehicle 2 to the autonomous driving ECU 20.

The map database 24 is a database that records map information. The map database 24 is formed, for example, in a recording device such as a hard disk drive (HDD) mounted on the autonomous driving vehicle 2. The map information includes information on the position of the road, information on the shape of the road (for example, curvature information) and information on the position of the intersection and the branch. The map information may include traffic regulation information such as a legal speed associated with the position information. The map information may include target object information used for acquiring the position information of the autonomous driving vehicle 2. As the target, road signs, road markings, traffic signals, utility poles, and the like can be used. The map database 24 may be configured as a server that can communicate with the autonomous driving vehicle 2. The server is not limited to the remote instruction server 10.

The communication unit 25 is a communication device that controls the wireless communication with the outside of the autonomous driving vehicle 2. The communication unit 25 transmits and receives various information with the remote instruction server 10 via the network N.

The vehicle actuator 26 is a device used for controlling the autonomous driving vehicle 2. The vehicle actuator 26 includes at least a drive actuator, a brake actuator and a steering actuator. The drive actuator controls a driving force of the autonomous driving vehicle 2 by controlling an amount of air (throttle opening degree) supplied to the engine according to a control signal from the autonomous driving ECU 20. If the autonomous driving vehicle 2 is a hybrid vehicle, in addition to the amount of air supplied to the engine, the control signal from the autonomous driving ECU 20 is input to a motor as a power source, and then, the driving force is controlled. If the autonomous driving vehicle 2 is an electric vehicle, the control signal from the autonomous driving ECU 20 is input to a motor as a power source, and then, the driving force of the vehicle V is controlled. The motor as the power source in these cases configures the vehicle actuator 26.

The brake actuator controls the brake system according to a control signal from the autonomous driving ECU 20 and controls a braking force applied to the vehicle wheels of the autonomous driving vehicle 2. For example, a hydraulic brake system can be used as the brake system. The steering actuator controls the driving of an assist motor controlling a steering torque of an electric power steering system according to a control signal from the autonomous driving ECU 20. In this way, the steering actuator controls the steering torque of the autonomous driving vehicle 2.

Next, a functional configuration of the autonomous driving ECU 20 will be described. The autonomous driving ECU 20 includes a vehicle position acquisition unit 31, an external environment recognition unit 32, a travel state recognition unit 33, a remote instruction request determination unit 34, a trajectory generation unit 35, an autonomous driving control unit 36, and an emergency braking determination unit 37.

The vehicle position acquisition unit 31 acquires position information of the autonomous driving vehicle 2 based on the position information on the GPS receiver 21 and the map information on the map database 24. In addition, the vehicle position acquisition unit 31 may acquire the position information of the autonomous driving vehicle 2 using the target object information included in the map information on the map database 24 and the result of detection performed by the external sensor 22 using the simultaneous localization and mapping (SLAM) technology. The vehicle position acquisition unit 31 may recognize a lateral position of the autonomous driving vehicle 2 relative to a lane (the position of the autonomous driving vehicle 2 in the lane width direction) from a position relationship between lane marking lines and the autonomous driving vehicle 2, and then, may include the lateral position in the position information. The vehicle position acquisition unit 31 may acquire the position information of the autonomous driving vehicle 2 using another known method.

The external environment recognition unit 32 recognizes the external environment of the autonomous driving vehicle 2 based on the result of detection performed by the external sensor 22. The external environment includes a relative position of surrounding objects relative to the autonomous driving vehicle 2. The external environment may include the relative speed and moving direction of the surrounding objects relative to the autonomous driving vehicle 2. The external environment may include types of the objects such as other vehicles, pedestrians, and bicycles. The types of the object can be identified by a known method such as pattern matching. The external environment may include a result of recognition of the marking lines (lane line recognition) around the autonomous driving vehicle 2. The external environment may include a result of recognition of a lighting state of a traffic signal. The external environment recognition unit 32 can recognize the lighting state of the traffic signal (the lighting state in which the vehicle can pass or the lighting state in which the vehicle is not allowed to pass) in front of the autonomous driving vehicle 2 based on, for example, the image from the camera of the external sensor 22.

The travel state recognition unit 33 recognizes the travel state of the autonomous driving vehicle 2 based on the result of detection performed by the internal sensor 23. The travel state includes the vehicle speed of autonomous driving vehicle 2, the acceleration of autonomous driving vehicle 2, and the yaw rate of autonomous driving vehicle 2. Specifically, the travel state recognition unit 33 recognizes the vehicle speed of the autonomous driving vehicle 2 based on the vehicle speed information from the vehicle speed sensor. The travel state recognition unit 33 recognizes the acceleration of the autonomous driving vehicle 2 based on the vehicle speed information from the accelerator sensor. The travel state recognition unit 33 recognizes the orientation of the autonomous driving vehicle 2 based on the yaw rate information from the yaw rate sensor.

The remote instruction request determination unit 34 determines whether a remote instruction request to the remote operator R is required or not. The remote instruction request determination unit 34 determines whether the remote instruction request is required or not based on at least one of the position information of the autonomous driving vehicle 2 acquired by the vehicle position acquisition unit 31 and the map information on the map database 24, the external environment recognized by the external environment recognition unit 32, and the trajectory generated by the trajectory generation unit 35 described later.

When the autonomous driving vehicle 2 is in a remote instruction request required situation set in advance, the remote instruction request determination unit 34 determines that the remote instruction request is required. The remote instruction request determination unit 34 determines that that remote instruction request is required when, for example, the autonomous driving vehicle 2 is in a situation of turning right at the intersection. The remote instruction request determination unit 34 may determine that the remote instruction request is required when the autonomous driving vehicle 2 is in a situation of approaching the intersection with a traffic signal or the intersection with a poor visibility. The remote instruction request determination unit 34 may determine that the remote instruction request is required when the autonomous driving vehicle 2 is in a situation of starting to change the lane for arriving at the destination. The remote instruction request determination unit 34 may determine that the remote instruction request is required when an obstacle for which the avoidance offset is required is present in front of the autonomous driving vehicle 2.

The remote instruction request determination unit 34 can recognize that the autonomous driving vehicle 2 is in the situation of turning right at the intersection, the autonomous driving vehicle 2 is in the situation of approaching the intersection with a traffic signal, or the autonomous driving vehicle 2 is in the situation of starting the lane change, form the position information, the map information, and the trajectory of the autonomous driving vehicle 2, for example. In addition, the remote instruction request determination unit 34 can recognize that the obstacle for which the avoidance offset is required is present in front of the autonomous driving vehicle 2 based on the external environment of the autonomous driving vehicle 2.

If it is determined that the remote instruction request is required, the remote instruction request determination unit 34 requests for the remote instruction by the remote operator R to the remote instruction server 10. The request for the remote instruction includes, for example, identification information on the autonomous driving vehicle 2. The remote instruction request determination unit 34 may request for the remote instruction with a margin time in advance. When a distance between the intersection or the like subject to the remote instruction and the autonomous driving vehicle 2 is equal to or shorter than a certain distance, the remote instruction request determination unit 34 may determine that the remote instruction request is required. The remaining time for arrival may be used instead of the distance.

When it is determined that the remote instruction request is required, the remote instruction request determination unit 34 transmits the travel situation information on the autonomous driving vehicle 2 to the remote instruction server 10. The travel situation information on the autonomous driving vehicle 2 includes information for the remote operator R to recognize the situation of the autonomous driving vehicle 2.

Specifically, the travel situation information on the autonomous driving vehicle 2 includes the position information of the autonomous driving vehicle 2 and detection information from the vehicle-mounted sensor of the autonomous driving vehicle 2. The detection information from the vehicle-mounted sensor includes an image by the camera of the external sensor 22. The detection information from the vehicle-mounted sensor may include, for example, an image in front of the autonomous driving vehicle 2 captured by the camera of the autonomous driving vehicle 2. The detection information from the vehicle-mounted sensor may include an image of surroundings of the autonomous driving vehicle 2 including the side and rear direction of the autonomous driving vehicle 2. The detection information from the vehicle-mounted sensor may include information on objects detected by the radar sensor of the external sensor 22. The detection information from the vehicle-mounted sensor may include a result of identification of the types of the objects. The remote instruction request determination unit 34 may use the external environment information on the autonomous driving vehicle 2 recognized by the external environment recognition unit 32 as the detection information on the vehicle-mounted sensor.

The detection information from the vehicle-mounted sensor may include information on the vehicle speed of the autonomous driving vehicle 2 detected by the vehicle speed sensor of the internal sensor 23. The detection information from the vehicle-mounted sensor may include information on the yaw rate of the autonomous driving vehicle 2 detected by the yaw rate sensor of the internal sensor 23. The detection information from the vehicle-mounted sensor may include information on the steering angle of the autonomous driving vehicle 2. The remote instruction request determination unit 34 may use the information on the travel state of the autonomous driving vehicle 2 recognized by the travel state recognition unit 33 as the detection information from the vehicle-mounted sensor.

Furthermore, the travel situation information on the autonomous driving vehicle 2 may include information relating to the occupant (the presence or absence of the occupant, the number of occupants). The travel situation information on the autonomous driving vehicle 2 may include information on the trajectory according to the remote instruction that can be selected by the remote operator R. The trajectory will be described later.

The autonomous driving ECU 20 may be configured to transmit the travel situation information on the autonomous driving vehicle 2 to the remote instruction server 10 at a timing set in advance regardless of a result of determination whether or not the remote instruction request is required. The timing set in advance may be every fixed period of time, every road node on the map, every event such as approaching a pedestrian crossing or approaching an intersection.

The trajectory generation unit 35 generates a trajectory used for the autonomous driving of the autonomous driving vehicle 2. The trajectory generation unit 35 generates the autonomous driving trajectory based on a travel route set in advance, the map information, the position information of the autonomous driving vehicle 2, the external environment of the autonomous driving vehicle 2, and the travel state of the autonomous driving vehicle 2.

The travel route is a route on which the autonomous driving vehicle 2 travels in the autonomous driving. The trajectory generation unit 35 obtains the autonomous driving travel route based on, for example, a destination, the map information, and the position information of the autonomous driving vehicle 2. The travel route may be set by a known navigation system. The destination may be set by the occupant of the autonomous driving vehicle 2, or may be automatically proposed by the autonomous driving ECU 20 or the navigation system.

The trajectory includes a path on which the vehicle travels in autonomous driving and a vehicle speed profile in the autonomous driving. The path is a locus that the vehicle in the autonomous driving will travel on the travel route. For example, data on the change of the steering angle of the autonomous driving vehicle 2 according to the position on the travel route (steering angle profile) can be the path. The position on the travel route is, for example, a set longitudinal position set in each predetermined interval (for example, 1 m) in the traveling direction of the travel route. The steering angle profile is data in which a target steering angle is associated with each set longitudinal position.

The trajectory generation unit 35 generates the path on which the autonomous driving vehicle 2 will travel, based on, for example, the travel route, the map information, the external environment of the autonomous driving vehicle 2, and the travel state of the autonomous driving vehicle 2. The trajectory generation unit 35 generates the path such that, for example, the autonomous driving vehicle 2 passes through the center of the lane included in the travel route (the center in the lane width direction).

The vehicle speed profile is data in which a target vehicle speed is associated with each set longitudinal position, for example. The set longitudinal position may be set based on the traveling time of the autonomous driving vehicle 2 instead of the distance. The set longitudinal position may be set as an arrival position of the vehicle after 1 second or an arrival position of the vehicle after 2 seconds.

The trajectory generation unit 35 generates the vehicle speed profile based on traffic regulation information such as a legal speed included in the path and map information, for example. Instead of the legal speed, a legal speed set in advance for the position or the section on the map may be used. The trajectory generation unit 35 generates an autonomous driving trajectory from the path and the vehicle speed profile. The method of generating the trajectory by the trajectory generation unit 35 is not limited to the above-described content, and a well-known method regarding the autonomous driving can be adopted. The same applies to the contents of trajectory.

If the remote instruction is requested to the remote instruction server 10 by the remote instruction request determination unit 34, the trajectory generation unit 35 generates the trajectory corresponding to the remote instruction in advance. The content of the remote instruction is determined in advance according to the situation of the autonomous driving vehicle 2. For example, the content of the remote instruction at the time of the right turn at the intersection includes a remote instruction to start (progressive traveling) the right turn and a remote instruction to wait. The content of the remote instruction at the right turn at the intersection may include a remote instruction to stop the right turn and to go straight, or may include the remote instruction for the emergency evacuation.

The trajectory generation unit 35 generates a trajectory for the autonomous driving vehicle 2 to turn right at the intersection such that, for example, the autonomous driving vehicle 2 responses to the remote instruction to start the right turn in a situation of turning right at the intersection. The trajectory generation unit 35 may update the trajectory according to the change in the external environment until the remote instruction is received. In addition, if the remote instruction to switch to go straight at the intersection from the right turn at the intersection is present, the trajectory generation unit 35 may generate the trajectory to go straight through the intersection.

If the remote instruction for the emergency evacuation is present, the trajectory generation unit 35 may generate the trajectory for the emergency evacuation in advance. The emergency evacuation trajectory is generated such that the autonomous driving vehicle 2 stops at any of the evacuation spaces set on the map in advance. The trajectory generation unit 35 recognizes the presence or absence of an obstacle at each evacuation space based on the external environment, for example, and generates the trajectory for the emergency evacuation to stop at an empty evacuation space. The trajectory generation unit 35 does not necessarily need to generate the trajectory in advance, and may generate the trajectory in response to the remote instruction after receiving the remote instruction.

The autonomous driving control unit 36 performs the autonomous driving of the autonomous driving vehicle 2. The autonomous driving control unit 36 performs the autonomous driving of the autonomous driving vehicle 2 based on, for example, the external environment of the autonomous driving vehicle 2, the travel state of the autonomous driving vehicle 2, and the trajectory generated by the trajectory generation unit 35. The autonomous driving control unit 36 performs the autonomous driving of the autonomous driving vehicle 2 by transmitting a control signal to the actuator 26.

If the remote instruction is requested to the remote instruction server 10 by the remote instruction request determination unit 34, the autonomous driving control unit 36 waits for the reception of the remote instruction from the remote instruction server 10. If the remote instruction is requested after the autonomous driving vehicle 2 stops, the autonomous driving control unit 36 remains the stopped state until the remote instruction is received.

If the occupant having a driver's license is on board and when the remote instruction is not received even after a waiting time set in advance has elapsed, the autonomous driving control unit 36 may require a determination by the occupant or the manual driving. If the remote instruction is not received even after the waiting time has elapsed, and the determination by the occupant or the manual driving is not possible, the autonomous driving control unit 36 may perform the emergency evacuation autonomously.

The emergency braking determination unit 37 determines whether or the emergency brake is necessary or not based on the external environment of the autonomous driving vehicle 2 or the result of detection performed by the external sensor 22 (camera image and/or the object information from the radar sensor). For example, when a time to collision (TTC) between the obstacles ahead of the autonomous driving vehicle 2 and the autonomous driving vehicle 2 becomes shorter than a TTC threshold value, the emergency braking determination unit 37 determines that the emergency brake is necessary. The TTC threshold value is a threshold value set in advance. Instead of the time to collision, an inter-vehicle time (time headway (THW)) may be used, or a distance between the autonomous driving vehicle 2 and the obstacle may be used.

If it is determined that the emergency brake is necessary, the emergency braking determination unit 37 transmits the control signal to the brake actuator and performs the emergency braking. The determination for the emergency brake is performed independently of the autonomous driving function. The emergency braking determination unit 37 may be formed in an electronic unit different from the autonomous driving ECU 20. The emergency braking may be performed by a so-called pre-crash safety (PCS) system.

Configuration of Remote Instruction Apparatus

Hereinafter, a configuration of the remote instruction apparatus 1 according to the present embodiment will be described with reference to the drawings. As illustrated in FIG. 1, the remote instruction apparatus 1 includes a remote instruction server 10, an operator interface 3, and a remote instruction result database 4.

Figure 3:
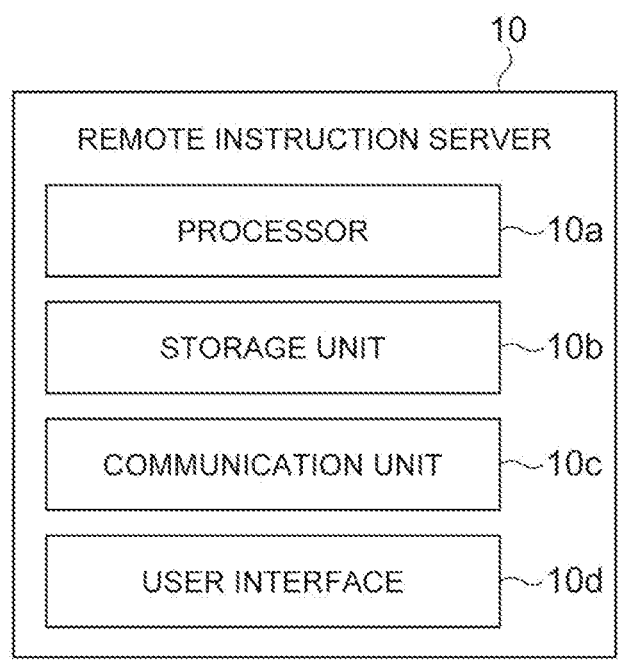
FIG. 3 is a block diagram illustrating an example of a hardware configuration of a remote instruction server.

First, a hardware configuration of the remote instruction server 10 will be described. FIG. 3 is a block diagram illustrating an example of the hardware configuration of the remote instruction server 10. As illustrated in FIG. 3, the remote instruction server 10 is configured as a general computer including a processor 10a, a storage unit 10b, a communication unit 10c, and a user interface 10d.

The processor 10a controls the remote instruction server 10 by operating various operating systems. The processor 10a is an arithmetic unit such as a central processing unit (CPU) including a control device, an arithmetic device, a register, and the like. The processor 10a performs overall management of the storage unit 10b, the communication unit 10c, and the user interface 10d. The storage unit 10b is configured to include at least one of a memory and a storage. The memory is a recording medium such as read only memory (ROM) or random access memory (RAM). The storage is a recording medium such as a hard disk drive (HDD).

The communication unit 10c is a communication device for performing communication via the network N. A network device, a network controller, a network card, and the like can be used for the communication unit 10c. The user interface 10d is an input output unit of the remote instruction server 10 to and from the user such as an administrator. The user interface 10d includes output devices such as a display and a speaker, and an input device such as a touch panel. The remote instruction server 10 does not necessarily need to be provided in the facility, and may be mounted on a moving body such as a vehicle.

Figure 4:
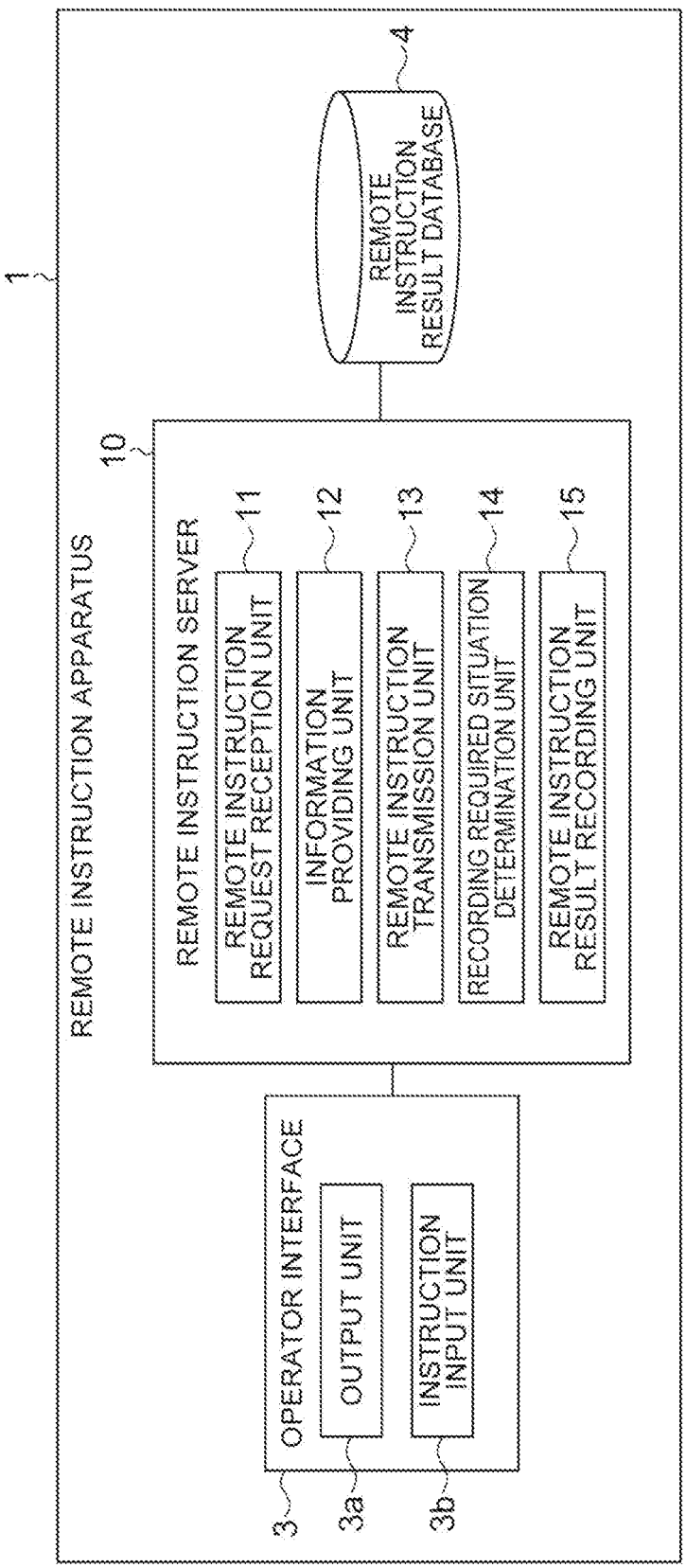
FIG. 4 is a block diagram illustrating an example of a configuration of a remote instruction apparatus.

FIG. 4 is a block diagram illustrating an example of the configuration of the remote instruction apparatus 1. As illustrated in FIG. 4, the operator interface 3 is an input output unit of the remote instruction apparatus 1 to and from the remote operator R. The operator interface 3 includes an output unit 3a and an instruction input unit 3b.

The output unit 3a is a device that outputs information used for the remote instruction of the autonomous driving vehicle 2 to the remote operator R. The output unit 3a includes a display that outputs image information and a speaker that outputs sound information.

For example, an image (an image of a scenery ahead) in front of the autonomous driving vehicle 2 captured by the camera of the autonomous driving vehicle 2 is displayed on the display. The display may have a plurality of display screens, and images of the side and/or rear of the autonomous driving vehicle 2 may be displayed. The display is not particularly limited as long as the display can provide visual information to the remote operator R. The display may be a wearable device mounted to cover the eyes of the remote operator R.

The speaker is a headset speaker mounted to a head of the remote operator R, for example. For example, the speaker informs the remote operator R of the situation of the autonomous driving vehicle 2 (for example, the situation such as a right turn at the intersection) by the voice. The speaker does not necessarily need to be a headset, and may be a stationary type.

The output unit 3a may provide the information to the remote operator R by vibration. The output unit 3a may include, for example, a vibration actuator provided on a seat of the remote operator R. The output unit 3a may alert the remote operator R about the approach of another vehicle to the autonomous driving vehicle 2 by the vibration. The output unit 3a may include the vibration actuators on the left and right sides of the seat, and may vibrate the vibration actuators at the positions corresponding to the approaching direction of other vehicles. The output unit 3a may include a wearable vibration actuator that is mounted to a body of the remote operator R. The output unit 3a can provide the information to the remote operator R by vibrating the vibration actuator mounted at each position of the body in accordance with the approaching direction of the other vehicles.

The instruction input unit 3b is a device to which the remote instruction is input from the remote operator R. The instruction input unit 3b includes, for example, an operation lever. In the instruction input unit 3b, for example, a remote instruction to cause the autonomous driving vehicle 2 to perform progressive traveling is input by pushing down the operation lever to the inner side in the front-rear direction of the remote operator R, and a remote instruction to decelerate or to stop the autonomous driving vehicle 2 is input by pulling down the operating lever to a front side in the front-rear direction of the remote operator R.

The instruction input unit 3b may include a button, and the remote instruction may be input by the remote operator R pulling or pushing down the operation lever while pressing the button. The instruction input unit 3b may include a touch panel. The touch panel may be shared with the display of the output unit 3a. The instruction input unit 3b may include an operation pedal.

The instruction input unit 3b may have a voice recognition function or a gesture recognition function. The gesture of the remote operator R can be recognized by the camera and/or the radar sensor mounted on the operator interface 3. In the instruction input unit 3b, the remote instruction may be input by combining equal to or more than two of the operation lever operation, the button operation, the touch panel operation, the operation pedal operation, the voice input, and the gesture.

The remote instruction result database 4 is a database in which a result of remote instruction is recorded. The result of remote instruction includes at least position information of the autonomous driving vehicle 2. The result of remote instruction may include detection information from the vehicle-mounted sensor of autonomous driving vehicle 2. A configuration of the autonomous driving vehicle 2 will be described later. The result of remote instruction may include identification information of the remote operator R. The remote instruction result database 4 does not necessarily need to be included in the remote instruction apparatus 1, but may be formed in a server or the like of a different facility.

Next, a functional configuration of the remote instruction server 10 will be described. As illustrated in FIG. 4, the remote instruction server 10 includes a remote instruction request reception unit 11, an information providing unit 12, a remote instruction transmission unit 13, a recording required situation determination unit 14, and a remote instruction result recording unit 15.

If the autonomous driving vehicle 2 requests the remote instruction server 10 for the remote instruction, the remote instruction request reception unit 11 receives the request for the remote instruction. In addition, the remote instruction request reception unit 11 acquires the travel situation information on the autonomous driving vehicle 2 which requested for the remote instruction, by the transmission from the autonomous driving vehicle 2. The remote instruction request reception unit 11 may acquire the travel situation information on the autonomous driving vehicle 2 which does not request for the remote instruction.

The information providing unit 12 provides various types of information to the remote operator R. If the remote instruction request reception unit 11 receives the request for the remote instruction, the information providing unit 12 requests the responsible remote operator R via the operator interface 3 to input the remote instruction.

In addition, the information providing unit 12 provides information on the autonomous driving vehicle 2 to the remote operator R based on the travel situation information on the autonomous driving vehicle 2 acquired by the remote instruction request reception unit 11. For example, the information providing unit 12 displays an image in front of the autonomous driving vehicle 2 on the display of the output unit 3*a* of the operator interface 3. The information providing unit 12 may display an image viewed from the vicinity of the driver's seat of the autonomous driving vehicle 2 by viewpoint conversion. The information providing unit 12 may display the side image and rear image of the autonomous driving vehicle 2. The information providing unit 12 may display a panoramic image that is a composite image of the images in which the surroundings of the autonomous driving vehicle 2 are captured, or may display an overhead image generated to look down the autonomous driving vehicle 2 by the image composition and the viewpoint conversion. The information providing unit 12 may perform highlight display of an object in the image (for example, marking that surrounds another vehicle or the like with a frame). If a traffic signal is included in the image, the information providing unit 12 may display a result of recognizing the lighting state of the traffic signal on the display.

The information providing unit 12 may display various information on the display, not limited to the image captured by the camera of the autonomous driving vehicle 2. The information providing unit 12 may display the situation of the autonomous driving vehicle 2 which requested for the remote instruction (the situation at the time of the right turn at the intersection, the situation avoiding the obstacle by offset, or the like) using texts or icons. The information providing unit 12 may display a type of remote instruction (progressive traveling, waiting, and the like) that can be selected by the remote operator R, on the display. The information providing unit 12 may display the information (a locus on which the autonomous driving vehicle 2 performs progressive traveling corresponding to the remote instruction to perform the progressive traveling) relating to the trajectory of the autonomous driving vehicle 2 in accordance with the remote instruction, on the display.

The information providing unit 12 may display the information on an object detected by the radar sensor of the autonomous driving vehicle 2. The information on the object may be displayed as an icon in the overhead image. When the types of the objects are identified, the icons may be displayed according to the types of the objects. The information providing unit 12 may display the map information on the surroundings of the autonomous driving vehicle 2 acquired based on the position information of the autonomous driving vehicle 2, on the display. The map information may be included in the remote instruction server 10 or may be acquired from another server or the like. The map information on the surroundings of the autonomous driving vehicle 2 may be acquired from the autonomous driving vehicle 2.

The information providing unit 12 may display road traffic information acquired based on the position information of the autonomous driving vehicle 2, on the display. The road traffic information includes at least one of information on a traffic jam occurring section or a construction section, information on an accident position, and the like. The road traffic information can be acquired from, for example, a traffic information center.

The information providing unit 12 may display information on the vehicle speed of the autonomous driving vehicle 2 on the display, and may display information on the steering angle of the autonomous driving vehicle 2 on the display. The information providing unit 12 may display information on a slope of the road where the autonomous driving vehicle 2 is positioned, on the display. If the autonomous driving vehicle 2 has a vehicle interior camera, the information providing unit 12 may display an image of the vehicle interior of the autonomous driving vehicle 2 as necessary. The information providing unit 12 may display a occupant's boarding situation and/or luggage loading situation in the autonomous driving vehicle 2, on a display.

The information providing unit 12 provides the sound information to the remote operator R through the speaker of the output unit 3*a* of the operator interface 3. The information providing unit 12 may output the situation (at the time of right turn at the intersection, at the time of avoiding the obstacle by the offset, or the like) of the autonomous driving vehicle 2, from the speaker as the voice. The information providing unit 12 may output the approach of another vehicle or the like around the autonomous driving vehicle 2, from the speaker as the sound or the voice. The information providing unit 12 may directly output the sound (noise) around the autonomous driving vehicle 2, from the speaker. The information providing unit 12 may output an occupant's voice in the vehicle, from the speaker as necessary. In some embodiments, the information may not be provided through the speaker.

In addition, if the output unit 3*a* includes the vibration actuator, the information providing unit 12 may provide the information to the remote operator R by the vibration. In this case, the information providing unit 12 can provide the information to the remote operator R (alert) by, for example, vibrating the vibration actuator at a position corresponding to the direction to which attention should be paid, such as the approaching direction of another vehicle to the autonomous driving vehicle 2 or the direction where a pedestrian is present.

If the remote operator R inputs the remote instruction to the instruction input unit 3b of the operator interface 3, the remote instruction transmission unit 13 transmits the remote instruction to the autonomous driving vehicle 2. If the remote instruction input by the remote operator R is sent to the autonomous driving vehicle 2, the information providing unit 12 may continuously transmit the information on the autonomous driving vehicle 2 to the remote operator R, or may switch the information to information on another autonomous driving vehicle 2 that requests for the remote instruction.

If the remote instruction is transmitted to the autonomous driving vehicle 2, the remote instruction transmission unit 13 acquires traveling result information on the autonomous driving vehicle 2 that travels according to the remote instruction. The traveling result information includes the position information of the autonomous driving vehicle 2 and the detection information from the vehicle-mounted sensor of autonomous driving vehicle 2. The traveling result information may include the information on whether or not the emergency brake is operated. The traveling result information can be the information similar to the travel situation information described above.

The recording required situation determination unit 14 determines whether or not the autonomous driving vehicle 2 traveling according to the remote instruction is in a predetermined recording required situation based on the traveling result information on the autonomous driving vehicle 2 (the detection information on the autonomous driving vehicle 2 from the vehicle-mounted sensor). The recording required situation is the situation of the autonomous driving vehicle 2 which is to be the target of recording the result of remote instruction.

Figure 5B:
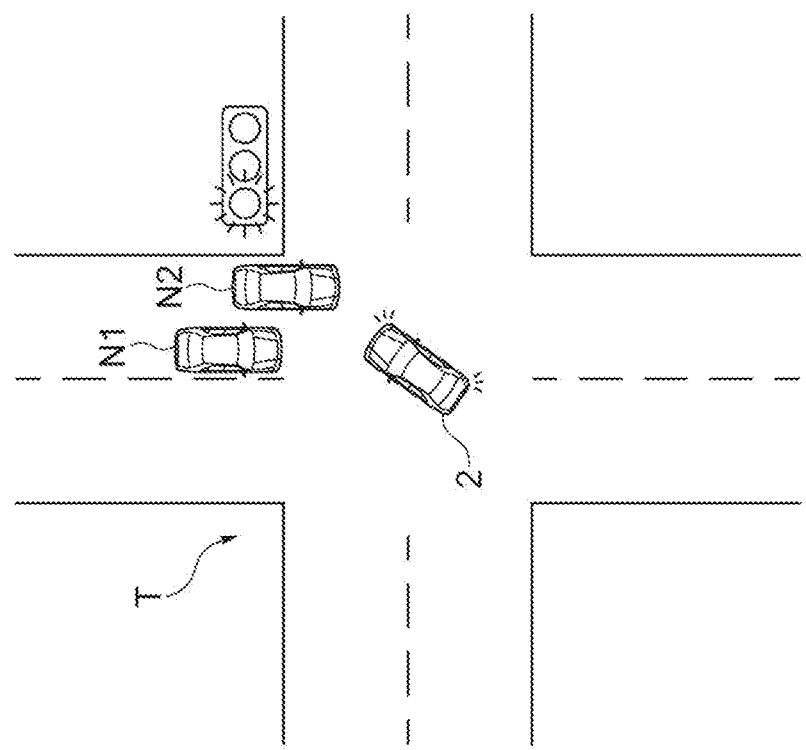
FIG. 5B is a plan view illustrating an example when the autonomous driving vehicle is in the recording required situation.
Figure 5A:
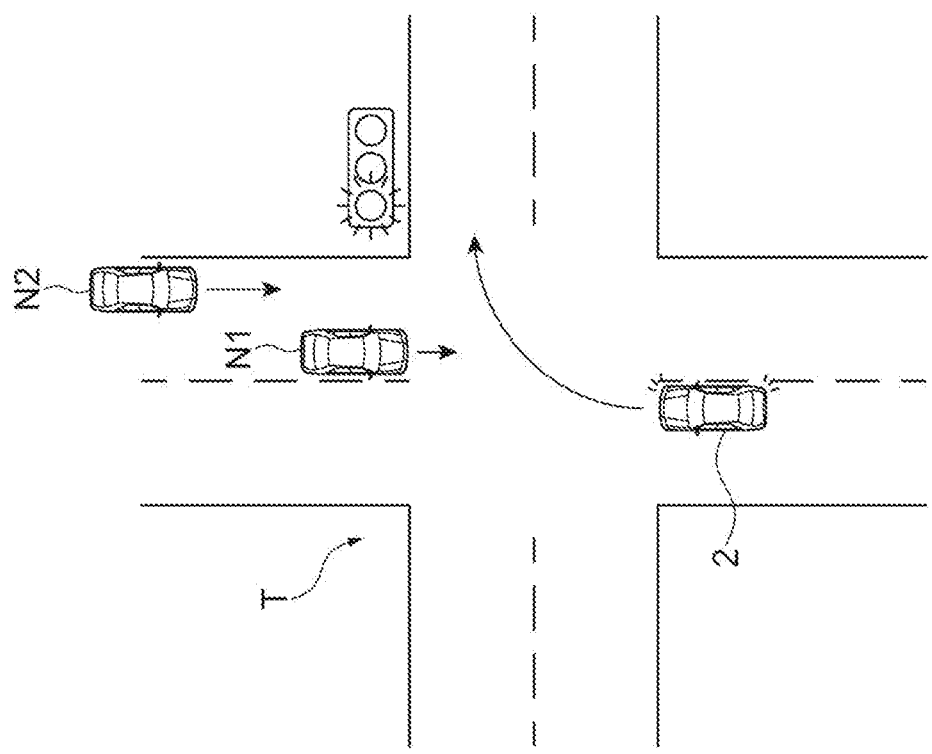
FIG. 5A is a plan view illustrating an example before an autonomous driving vehicle is in a recording required situation.

For example, if the emergency brake of the autonomous driving vehicle 2 traveling according to the remote instruction is operated, the recording required situation determination unit 14 determines that the autonomous driving vehicle 2 is in the recording required situation. Here, FIG. 5A is a plan view illustrating an example before an autonomous driving vehicle 2 is in the recording required situation. FIG. 5B is a plan view illustrating an example when the autonomous driving vehicle 2 is in the recording required situation.

FIG. 5A illustrates a crossroad intersection T and an oncoming vehicles N1 and N2 of the autonomous driving vehicle 2. The traffic signal at the intersection T is a lighting state (for example, a blue lighting state) of passing allowable. In order to start the right turn at the intersection T, the autonomous driving vehicle 2 that is in the autonomous driving requests the remote instruction server 10 of the remote instruction apparatus 1 for the remote instruction. In the situation illustrated in FIG. 5A, the oncoming vehicle N2 is positioned at a blind spot as seen from the autonomous driving vehicle 2 due to the presence of the oncoming vehicle N1. In addition, the oncoming vehicle N1 sees the right turn signal of the autonomous driving vehicle 2 and reduces the speed. Here, it is assumed that the remote operator R inputs the remote instruction for the progressive traveling (starting the right turn) of the autonomous driving vehicle 2 without recognizing the presence of the oncoming vehicle N2.

Subsequently, in the situation illustrated in FIG. 5B, the autonomous driving vehicle 2 turning right according to the remote instruction from the remote operator R operates the emergency brake and stops due to the sudden approach of the oncoming vehicle N2. As described above, when the emergency brake of the autonomous driving vehicle 2 traveling according to the remote instruction is operated, the recording required situation determination unit 14 determines that the autonomous driving vehicle 2 is in the recording required situation. If it is determined that the autonomous driving vehicle 2 traveling according to the remote instruction is in the recording required situation, the information providing unit 12 may notify the remote operator R.

If the emergency brake is not operated, but if an obstacle such as a pedestrian is detected in the vicinity of the autonomous driving vehicle 2 traveling according to the remote instruction, the recording required situation determination unit 14 may determine that the autonomous driving vehicle 2 is in the recording required situation. Alternatively, if the obstacle such as the pedestrian is detected in the vicinity of the autonomous driving vehicle 2 traveling according to the remote instruction, the recording required situation determination unit 14 may determine that the autonomous driving vehicle 2 is in the recording required situation. The vicinity is a range within a certain fixed distance from the autonomous driving vehicle 2. The certain fixed distance is not particularly limited, and may be 0.5 m, 1 m, or 2 m.

If the remote operator R inputs the remote instruction to start the progressive traveling when approaching the intersection having the traffic signal or starting the right turn at the intersection having the traffic signal, and when the result of recognition of the lighting state of the traffic signal from the image is a lighting state that is passing not allowable, the recording required situation determination unit 14 may determine that the autonomous driving vehicle 2 is in the recording required situation.

If the remote operator R inputs the remote instruction to start the progressive traveling when approaching the intersection having the traffic signal or starting the right turn at the intersection having the traffic signal, and if the autonomous driving vehicle 2 stops at the intersection or on the pedestrian crossing immediately after passing the intersection because the destination road to enter after passing the intersection is blocked by other vehicles, the recording required situation determination unit 14 may determine that the autonomous driving vehicle 2 is in the recording required situation.

If the remote operator R inputs a remote instruction to wait at the time of starting the right turn at the intersection by the autonomous driving vehicle 2 approaching the intersection, and when the remote instruction for the progressive traveling is not input even after a certain period of time has elapsed, the recording required situation determination unit 14 may determine that the autonomous driving vehicle 2 is in the recording required situation. The certain period of time is not particularly limited, and may be 3 minutes or 5 minutes. The remote instruction for stop or delaying the instruction may be automatically transmitted when the remote operator R does not input the remote instruction after a predetermined time has elapsed.

If the remote operator R inputs the remote instruction for starting the progressive traveling at the time of offset avoidance for the obstacles ahead, and when a following vehicle approaching the adjacent lane where the autonomous driving vehicle 2 protrudes due to the offset, is detected, the recording required situation determination unit 14 may determine that the autonomous driving vehicle 2 is in the recording required situation. For example, when a reaction occurs on a blind spot monitor (BSM), it can be regarded that the following vehicle is detected. If the remote operator R inputs the remote instruction for starting the progressive traveling at the time of avoiding a stopped vehicle ahead by the offset, and when the stopped vehicle starts and avoidance by the offset is no longer necessary, the recording required situation determination unit 14 may determine that the autonomous driving vehicle 2 is in the recording required situation.

If the remote operator R inputs the remote instruction for starting the progressive traveling at the time of approaching the intersection with poor visibility, and when another vehicle intersecting the traveling direction of autonomous driving vehicle 2 is detected, the recording required situation determination unit 14 may determine that the autonomous driving vehicle 2 is in the recording required situation. It can be regarded that the another vehicle intersecting the traveling direction of autonomous driving vehicle 2 is detected when, for example, the front cross traffic alert (FCTA) reacts.

If the remote operator R inputs the remote instruction to wait during approaching the intersection with a poor visibility, and when the remote instruction for the progressive traveling is not input even after a certain period of time has elapsed, the recording required situation determination unit 14 may determine that the autonomous driving vehicle 2 is in the recording required situation. If the remote operator R inputs the remote instruction to wait during approaching the intersection with a poor visibility, and when the autonomous driving vehicle 2 is warned by a horn from another vehicle behind, the recording required situation determination unit 14 may determine that the autonomous driving vehicle 2 is in the recording required situation. The warning by the horn can be detected when a sound detection sensor that detects external sounds is mounted on the autonomous driving vehicle 2. In addition, passing may be detected as the warning from another vehicle behind.

Even when approaching the intersection with the traffic signal and when starting the right turn at the intersection, when the warning is received from another vehicle behind, the recording required situation determination unit 14 may determine that the autonomous driving vehicle 2 is in the recording required situation. In addition, the recording required situation determination unit 14 may determine whether or not the autonomous driving vehicle 2 is in the recording required situation based on the image captured by a road camera installed on the road (an image in which the autonomous driving vehicle 2 is included), in addition to the traveling result information on the autonomous driving vehicle 2. The recording required situation determination unit 14 may determine whether or not the autonomous driving vehicle 2 is in the recording required situation based on an image from a camera on other vehicle (an image in which the autonomous driving vehicle 2 is included), in addition to the traveling result information on the autonomous driving vehicle 2.

The remote instruction result recording unit 15 records a result of remote instruction when it is determined by the recording required situation determination unit 14 that the autonomous driving vehicle 2 is in the recording required situation. The remote instruction result recording unit 15 records the result of remote instruction in the remote instruction result database 4.

The remote instruction result recording unit 15 records the position information of the autonomous driving vehicle 2 traveling according to the remote instruction as the result of remote instruction. The recording target may be a part of the position information of the autonomous driving vehicle 2 traveling according to the remote instruction.

The remote instruction result recording unit 15 may record the detection information from the vehicle-mounted sensor of the autonomous driving vehicle 2 in association with the position information of the autonomous driving vehicle 2, as the result of remote instruction. The remote instruction result recording unit 15 may record the identification information on the remote operator R in association with the position information of the autonomous driving vehicle 2, as the result of remote instruction. The identification information on the remote operator R is not particularly limited as long as the remote operator R can be individually identified. The identification information on the remote operator R may be a number. The remote instruction result recording unit 15 may record all the position information of the autonomous driving vehicle 2, the detection information from the vehicle-mounted sensor of the autonomous driving vehicle 2, and the identification information on the remote operator R in association with each other, as the result of remote instruction.

The detection information from the vehicle-mounted sensor of the autonomous driving vehicle 2 to be recorded includes, for example, an image from the camera of the autonomous driving vehicle 2. If the traffic signal is included in the image, the remote instruction result recording unit 15 may cause the detection information to be recorded to include the result of recognition of the lighting state of the traffic signal in the image. If the autonomous driving vehicle 2 is determined to be in the recording required situation due to the emergency brake operation, the remote instruction result recording unit 15 may cause the result of determination to include the detection information from the vehicle-mounted sensor (the image from the camera and/or the object information from the radar sensor) relating to the operation of the emergency brake. The image from the camera may include not only the front image of the autonomous driving vehicle 2 but also a rear image or a side image. The object information from the radar sensor may also include not only the object in front of the autonomous driving vehicle 2 but also the object at the rear or the side of the autonomous driving vehicle 2.

The remote instruction result recording unit 15 may record the result of remote instruction when it is determined that the autonomous driving vehicle 2 is in the recording required situation, and may record a plurality of results of remote instructions during a period from the remote instruction is received from the remote operator R until it is determined that the autonomous driving vehicle 2 is in the recording required situation. The recording time for recording the result of remote instruction can be set arbitrarily.

In addition, the remote instruction result recording unit 15 may record vehicle information such as a vehicle type and specifications of the autonomous driving vehicle 2 in association with the result of remote instruction. The remote instruction result recording unit 15 may record the identification information on the autonomous driving vehicle 2 in association with the result of remote instruction. If the remote instruction is to perform the emergency evacuation, the remote instruction result recording unit 15 does not need to record the result of remote instruction regardless of the result of determination by the recording required situation determination unit 14.

Processing by Vehicle Remote Instruction System

Next, the processing by the remote instruction apparatus 1 of the vehicle remote instruction system 100 according to the present embodiment will be described with reference to the drawings. FIG. 6A is a flowchart illustrating an example of the remote instruction request processing.

As illustrated in FIG. 6A, as S10, the remote instruction server 10 of the remote instruction apparatus 1 determines whether or not the request for the remote instruction is received from the autonomous driving vehicle 2 using the remote instruction request reception unit 11. If it is determined that the request for the remote instruction is received from the autonomous driving vehicle 2 (YES in S10), the remote instruction server 10 makes the process proceed to S12. If it is determined that the request for the remote instruction is not received from the autonomous driving vehicle 2 (NO in S10), the remote instruction server 10 ends the current processing. Thereafter, the remote instruction server 10 repeats the processing in S10 again after a certain period of time has elapsed.

In S12, the remote instruction server 10 requests the remote operator R to input the remote instruction using the information providing unit 12. The information providing unit 12 provides the remote operator R with the information on the autonomous driving vehicle 2 that is a target of the remote instruction. Thereafter, the current processing is ended.

FIG. 6B is a flowchart illustrating an example of the remote instruction transmission processing. The remote instruction transmission processing is performed when the remote operator R is requested to input the remote instruction.

As illustrated in FIG. 6B, as S20, the remote instruction server 10 determines whether the remote operator R inputs the remote instruction or not using the remote instruction transmission unit 13. If it is determined that the remote operator R inputs the remote instruction (YES in S20), the remote instruction server 10 makes the process proceed to S22. If it is not determined that the remote operator R inputs the remote instruction (NO in S20), the remote instruction server 10 ends the current processing. Thereafter, the remote instruction server 10 repeats the processing in S20 again after a certain period of time has elapsed.

In S22, the remote instruction server 10 transmits the remote instruction to the autonomous driving vehicle 2 using the remote instruction transmission unit 13. Thereafter, the remote instruction server 10 ends the current processing. If the remote instruction is to wait, the remote instruction server 10 repeats the processing from S20.

Figure 7A:
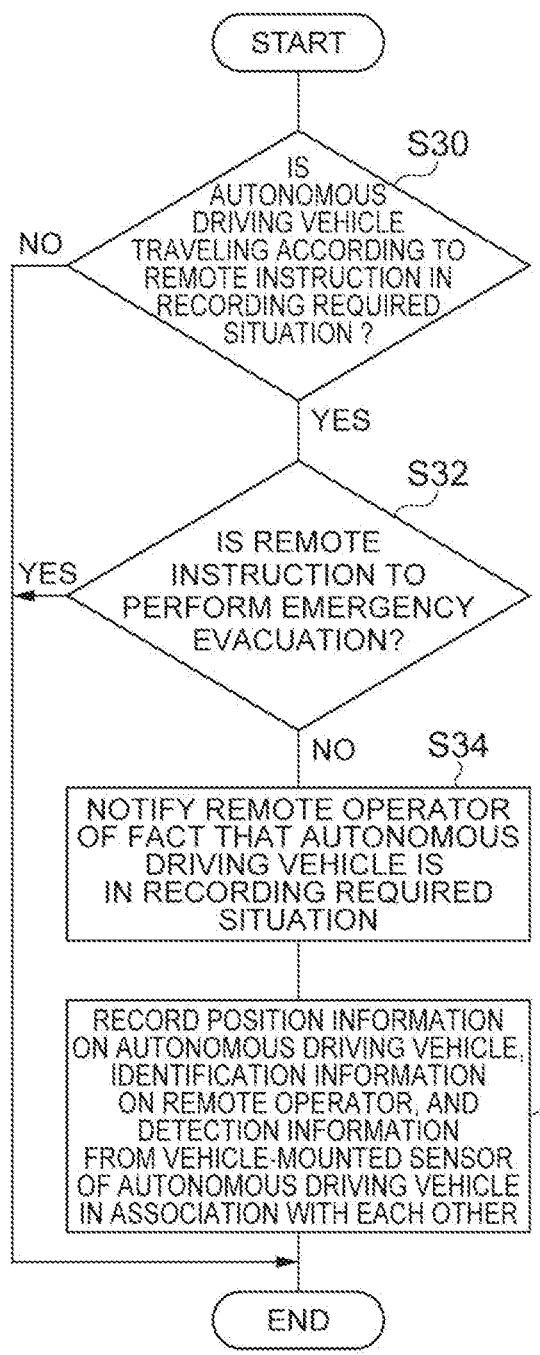
FIG. 7A is a flowchart illustrating an example of remote instruction result recording processing.

FIG. 7A is a flowchart illustrating an example of the remote instruction result recording processing. The remote instruction result recording processing is performed when the remote instruction is transmitted to the autonomous driving vehicle 2.

As illustrated in FIG. 7A, as S30, the remote instruction server 10 determines whether or not the autonomous driving vehicle 2 traveling according to the remote instruction is in the recording required situation using the recording required situation determination unit 14. If it is determined that the autonomous driving vehicle 2 is in the recording required situation (YES in S30), the remote instruction server 10 makes the process proceed to S32. If it is not determined that the autonomous driving vehicle 2 is in the recording required situation (NO in S30), the remote instruction server 10 ends the current processing. Thereafter, if the autonomous driving vehicle 2 according to the remote instruction continues to travel, the remote instruction server 10 repeats the processing in S30 again after a certain period of time has elapsed.

In S32, the remote instruction server 10 determines whether or not the remote instruction is to perform the emergency evacuation or not using the remote instruction result recording unit 15. If it is determined that the remote instruction is not to perform the emergency evacuation (NO in S32), the remote instruction server 10 makes the process proceed to S34. If it is determined that the remote instruction is to perform the emergency evacuation (YES in S32), the remote instruction server 10 ends the current processing.

The determination in S32 may be performed prior to S30. If the remote instruction does not include the emergency evacuation, it is not necessary to perform S32. In addition, it is not necessary to perform S32, and even if the remote instruction is to perform the emergency evacuation, the result of remote instruction may be recorded.

In S34, the remote instruction server 10 notifies the remote operator R of a fact that the autonomous driving vehicle 2 is in the recording required situation using the information providing unit 12. The information providing unit 12 notifies the remote operator R via, for example, the operator interface 3. The notification may include any content as long as the notification content asks the remote operator R to confirm the situation of the autonomous driving vehicle 2. The processing in S34 does not necessarily need to be performed.

Thereafter, in S36, the remote instruction server 10 records the result of remote instruction using the remote instruction result recording unit 15. For example, as the result of remote instruction, the remote instruction result recording unit 15 records the position information of the autonomous driving vehicle 2, the detection information from the vehicle-mounted sensor of the autonomous driving vehicle 2, and the identification information on the remote operator R in association with each other. Thereafter, the remote instruction server 10 ends the current processing.

Figure 7B:
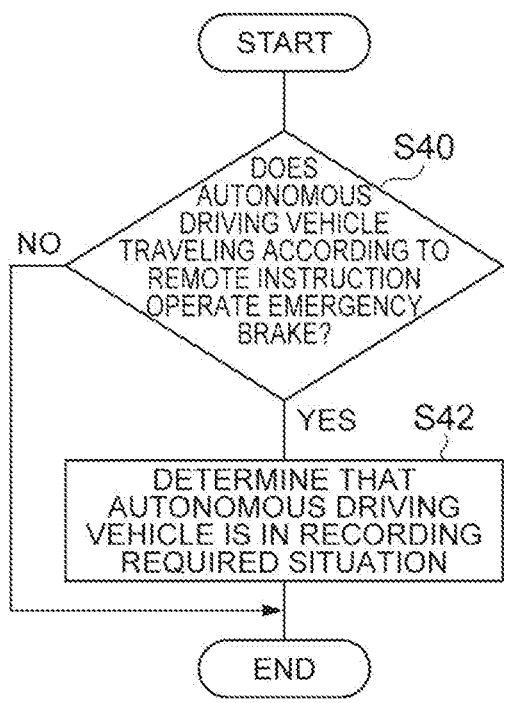
FIG. 7B is a flowchart illustrating an example of recording required situation determination processing.

FIG. 7B is a flowchart illustrating an example of the recording required situation determination processing. The recording required situation determination processing corresponds to S30 in FIG. 7A.

As illustrated in FIG. 7B, as S40, the remote instruction server 10 determines whether the autonomous driving vehicle 2 traveling according to the remote instruction operates the emergency brake or not using the recording required situation determination unit 14. If it is determined that the autonomous driving vehicle 2 operates the emergency brake (YES in S40), the remote instruction server 10 makes the process proceed to S42. If it is not determined that the autonomous driving vehicle 2 operates the emergency brake (NO in S40), the remote instruction server 10 ends the current processing (determination whether or not the vehicle is in the recording required situation due to the operation of the emergency brake).

In S42, the remote instruction server 10 determines that the autonomous driving vehicle 2 is in the recording required situation using the recording required situation determination unit 14. Thereafter, the remote instruction server 10 makes the process proceed to S32 in FIG. 7A.

According to the vehicle remote instruction system 100 described above, if it is determined that the autonomous driving vehicle 2 traveling according to the remote instruction is in the recording required situation, the position information of the autonomous driving vehicle 2 can be recorded as a result of remote instruction. In addition, in the vehicle remote instruction system 100, the result of remote instruction can be recorded in more detail by recording the position information of the autonomous driving vehicle and the detection information from the vehicle-mounted sensor of the autonomous driving vehicle in association with each other. Furthermore, in the vehicle remote instruction system 100, by recording the position information of the autonomous driving vehicle and the identification information on the remote operator in association with each other as the result of remote instruction, the result of remote instruction can be fed back to the remote operator, and thus, it is possible to use the result of remote instruction for improving the skill of the remote operator.

In addition, according to the vehicle remote instruction system 100, when the autonomous driving vehicle 2 traveling according to the remote instruction operates the emergency brake, it is determined that the autonomous driving vehicle 2 is in the recording required situation, and therefore, it is possible to appropriately record the result of remote instruction that needs to be recorded. Furthermore, according to the vehicle remote instruction system 100, if the remote instruction is to perform the emergency evacuation, since it is considered that the remote operator is likely to recognize the possibility that the autonomous driving vehicle may be in the recording required situation different from that of normal, it is possible to avoid the recording of even the information that does not need to be fed back to the remote operator by not recording the result of remote instruction.

The embodiment of the present disclosure is described above, but the present disclosure is not limited to the above-described embodiment. The present disclosure can be implemented in various forms including various modifications and improvements based on the knowledge of those skilled in the art including the above-described embodiment.

For example, the vehicle remote instruction system 100 may not include the autonomous driving vehicle 2 as the configuration element. In this case, the vehicle remote instruction system 100 corresponds to the remote instruction apparatus 1.

In the vehicle remote instruction system 100, instead of the autonomous driving vehicle 2, the remote instruction server 10 may determine the necessity of the remote instruction. In this case, the remote instruction server 10 determines whether or not the autonomous driving vehicle 2 is in the situation in which the remote instruction request is required, based on the travel situation information acquired from the autonomous driving vehicle 2. The remote instruction server 10 may transmit a waiting instruction to the autonomous driving vehicle 2 and may request the remote operator R to input the remote instruction when it is determined that the autonomous driving vehicle 2 is in the situation in which the remote instruction request is required.

The remote instruction apparatus 1 may be mounted on the vehicle. In this case, the remote operator R is also in the vehicle. The remote instruction server 10 may be a cloud server configured with ECUs of a plurality of vehicles.

Even if the remote operator R does not input the remote instruction after a waiting time set in advance has elapsed, the remote instruction result recording unit 15 may record the situation of the autonomous driving vehicle 2 as a result of remote instruction.

What is claimed is:

1. A vehicle remote instruction system in which a remote operator performs a remote instruction relating to travel of an autonomous driving vehicle according to a situation of the autonomous driving vehicle, the system comprising a remote instruction server configured to:
    determine whether or not the autonomous driving vehicle traveling according to the remote instruction is in a predetermined recording required situation in which an emergency brake is not operated and a pedestrian is detected in a vicinity of the autonomous driving vehicle, based on detection information from a vehicle-mounted sensor of the autonomous driving vehicle; and
    record position information of the autonomous driving vehicle as a result of the remote instruction, when it is determined by the remote instruction server that the autonomous driving vehicle is in the recording required situation,
    wherein the autonomous driving vehicle determines whether a remote instruction request is required based on at least the position of the vehicle and the trajectory of the vehicle;
    when it is determined that the remote instruction request is required, the autonomous driving vehicle transmits a request for remote instruction to the remote instruction server;
    wherein the autonomous driving vehicle generates a trajectory corresponding to the remote instruction in advance;
    wherein the autonomous driving vehicle determines whether an emergency evacuation is required based on detection of an abnormality of the autonomous driving vehicle or an abnormality of one or more occupants of the autonomous driving vehicle;
    upon determination that the emergency evacuation is required, the autonomous driving vehicle transmits a request for emergency remote instruction to the remote instruction server; and
    wherein the autonomous driving vehicle generates an emergency evacuation trajectory corresponding to the emergency remote instruction in advance, the emergency evacuation trajectory includes the autonomous driving vehicle stopping at one of a plurality of evacuation spaces set in advance.

2. The vehicle remote instruction system according to claim 1,
    wherein the remote instruction server is configured to determine that the autonomous driving vehicle is in the recording required situation, when the autonomous driving vehicle traveling according to the remote instruction operates the emergency brake.

3. The vehicle remote instruction system according to claim 1,
    wherein the remote instruction server is configured to record the position information of the autonomous driving vehicle and the detection information from the vehicle-mounted sensor of the autonomous driving vehicle in association with each other as the result of the remote instruction, when it is determined by the remote instruction server that the autonomous driving vehicle is in the recording required situation.

4. The vehicle remote instruction system according to claim 1,
    wherein the remote instruction server is configured to record the position information of the autonomous driving vehicle and identification information of the remote operator in association with each other as the result of the remote instruction, when it is determined by the remote instruction server that the autonomous driving vehicle is in the recording required situation.

5. The vehicle remote instruction system according to claim 4,
    wherein the remote instruction server is configured not to record the result of the remote instruction regardless of a result of the determination performed by the remote instruction server, when the remote instruction is to perform an emergency evacuation.

6. The vehicle remote instruction system according to claim 2, wherein the remote instruction server is configured to record the position information of the autonomous driving vehicle and the detection information from the vehicle-mounted sensor of the autonomous driving vehicle in association with each other as the result of the remote instruction, if it is determined by the remote instruction server that the autonomous driving vehicle is in the recording required situation.

7. The vehicle remote instruction system according to claim 2,
wherein the remote instruction server is configured to record the position information of the autonomous driving vehicle and identification information of the remote operator in association with each other as the result of the remote instruction, when it is determined by the remote instruction server that the autonomous driving vehicle is in the recording required situation.

8. The vehicle remote instruction system according to claim 1, wherein the remote instruction comprises obstacle avoidance to cause the autonomous driving vehicle to temporarily protrude in an adjacent lane or an opposite lane in order to avoid a stopped vehicle.

9. The vehicle remote instruction system according to claim 1, wherein the remote instruction comprises an instruction for starting the autonomous driving vehicle when the pedestrian is in the vicinity of the autonomous driving vehicle that has been stopped.

10. The vehicle remote instruction system according to claim 1, further comprising a plurality of cameras that capture images of the front of the autonomous driving vehicle, the left side of the autonomous driving vehicle, the right side of the autonomous driving vehicle, and the rear of the autonomous driving vehicle, and wherein the captured images are transmitted to the remote instruction server.

11. The vehicle remote instruction system according to claim 10, wherein the remote instruction server recognizes an external environment of the autonomous driving vehicle based on the captured images.

12. The vehicle remote instruction system according to claim 11, wherein the external environment recognized by the remote instruction server comprises a relative position of surrounding objects relative to the autonomous driving vehicle, relative speeds and moving directions of the surrounding objects, and types of the surrounding objects.

13. The vehicle remote instruction system according to claim 11, wherein the external environment recognized by the remote instruction server comprises lane lines around the autonomous driving vehicle, and a lighting state of a traffic signal in front of the autonomous vehicle.

14. The vehicle remote instruction system according to claim 1, wherein the remote instruction server recognizes a travel state of the autonomous driving vehicle based on a vehicle speed of the autonomous driving vehicle captured by a vehicle speed sensor, an acceleration of the autonomous driving vehicle captured by an acceleration sensor, and an orientation of the autonomous driving vehicle based on a yaw rate of the autonomous driving vehicle captured by a yaw rate sensor.

15. The vehicle remote instruction system according to claim 14, wherein the travel state of the autonomous driving vehicle comprises a number of occupants of the autonomous driving vehicle.

16. The vehicle remote instruction system according to claim 1, wherein the autonomous driving vehicle determines that the remote instruction request is required when the autonomous driving vehicle is in a situation of starting to change lanes for arriving at a destination.

17. The vehicle remote instruction system according to claim 1, wherein the autonomous driving vehicle determines that the remote instruction request is required when the autonomous driving vehicle is in a situation of approaching an intersection with a traffic signal or an intersection with poor visibility.

18. The vehicle remote instruction system according to claim 1, wherein the autonomous driving vehicle determines that the remote instruction request is required when an obstacle for which an avoidance offset is required is present in front of the autonomous driving vehicle based on an external environment of the vehicle.

19. The vehicle remote instruction system according to claim 1, wherein the autonomous driving vehicle determines that the remote instruction request is required when a distance between an intersection and the autonomous driving vehicle is equal to or less than a predetermined distance.

20. The vehicle remote instruction system according to claim 1, wherein the autonomous driving vehicle recognizes the presence or absence of an obstacle at each of the plurality of evacuation spaces and generates the emergency trajectory including the autonomous driving vehicle stopping at an empty evacuation space.

* * * * *